United States Patent
Friberg

(10) Patent No.: US 8,128,411 B2
(45) Date of Patent: *Mar. 6, 2012

(54) DEVICE FOR CHECKING ANESTHESIA AND VENTILATION UNITS

(75) Inventor: Harri Friberg, Mauren (CH)

(73) Assignee: imtmedical AG, Buchs (CH)

( * ) Notice: Subject to any disclaimer, the term of this patent is extended or adjusted under 35 U.S.C. 154(b) by 1010 days.

This patent is subject to a terminal disclaimer.

(21) Appl. No.: 11/719,498

(22) PCT Filed: Nov. 21, 2005

(86) PCT No.: PCT/IB2005/053834

§ 371 (c)(1),
(2), (4) Date: Aug. 8, 2007

(87) PCT Pub. No.: WO2006/056927

PCT Pub. Date: Jun. 1, 2006

(65) Prior Publication Data

US 2009/0215017 A1    Aug. 27, 2009

(30) Foreign Application Priority Data

Nov. 24, 2004    (CH) ........................ 1940/04

(51) Int. Cl.
G09B 23/28    (2006.01)

(52) U.S. Cl. .................. 434/262; 434/265; 434/272

(58) Field of Classification Search .................. 434/262, 434/265, 272; 128/200.24, 205.25, 206.15
See application file for complete search history.

(56) References Cited

U.S. PATENT DOCUMENTS

| 3,562,924 | A |   | 2/1971  | Baermann et al. |
| 3,808,706 | A | * | 5/1974  | Mosley et al. ............... 73/865.9 |
| 3,810,461 | A | * | 5/1974  | McCormick .................. 600/541 |
| RE29,317  | E | * | 7/1977  | Mosley et al. ............... 73/866.4 |
| 4,167,070 | A |   | 9/1979  | Orden |
| 4,430,893 | A | * | 2/1984  | Barkalow ........................ 73/168 |
| 4,898,166 | A |   | 2/1990  | Rose et al. |
| 4,984,987 | A |   | 1/1991  | Brault et al. |
| 4,996,980 | A |   | 3/1991  | Frankenberger et al. |
| 5,286,206 | A |   | 2/1994  | Epstein et al. |
| 5,385,139 | A | * | 1/1995  | Corn ....................... 128/200.24 |
| 5,403,192 | A |   | 4/1995  | Kleinwaks et al. |
| 5,580,255 | A |   | 12/1996 | Flynn et al. |
| 5,719,916 | A | * | 2/1998  | Nelson et al. .................. 378/207 |
| 5,975,748 | A | * | 11/1999 | East et al. ........................ 703/6 |

(Continued)

FOREIGN PATENT DOCUMENTS

DE    2403616    8/1974

(Continued)

OTHER PUBLICATIONS

International Search Report of PCT/IB2005/053834.

(Continued)

*Primary Examiner* — Kang Hu

(74) *Attorney, Agent, or Firm* — Matthew B. Dernier, Esq.; Gibson & Dernier LLP

(57) ABSTRACT

Apparatus for checking anaesthesia and ventilation devices, in the form of a test lung, comprising a lung sac, elastically deformable lobes, an inlet nozzle and adjustment means for adjusting the simulation parameters, the test lung being in the form of a compact unit and permitting the simulation of different lung types by adjustment of the lung parameters.

20 Claims, 2 Drawing Sheets

U.S. PATENT DOCUMENTS

| | | |
|---|---|---|
| 6,283,120 B1 | 9/2001 | Kellon |
| 6,874,501 B1 | 4/2005 | Estetter et al. |
| 6,921,267 B2 * | 7/2005 | van Oostrom et al. ........ 434/272 |
| 7,100,618 B2 | 9/2006 | Dominguez |
| D563,547 S | 3/2008 | Klien |
| 7,959,443 B1 * | 6/2011 | Frembgen et al. ............ 434/265 |
| 2002/0023648 A1 * | 2/2002 | Komesaroff ............ 128/205.25 |
| 2004/0058305 A1 | 3/2004 | Laurie et al. |

FOREIGN PATENT DOCUMENTS

| | | |
|---|---|---|
| DE | 2404616 | 8/1974 |
| DE | 3427182 | 1/1986 |
| DE | 19714684 A1 | 10/1998 |
| JP | H10-052496 A | 8/1996 |
| WO | 02/078768 A2 | 10/2002 |
| WO | 03/041778 A1 | 5/2003 |

OTHER PUBLICATIONS

International Preliminary Report on Patentability Application PCT/IB2005/053834.

International Written Opinion of PCT/IB2005/053834.

Continuation U.S. Appl. No. 13/053,679, filed Mar. 22, 2011, inventor: Friberg, H., titled: "Device for Checking Anesthesia and Ventilation Units".

* cited by examiner

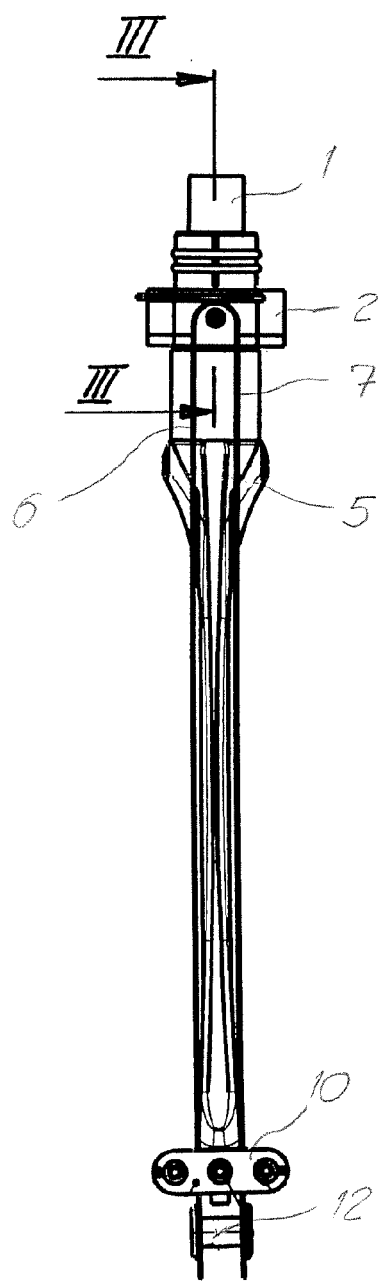
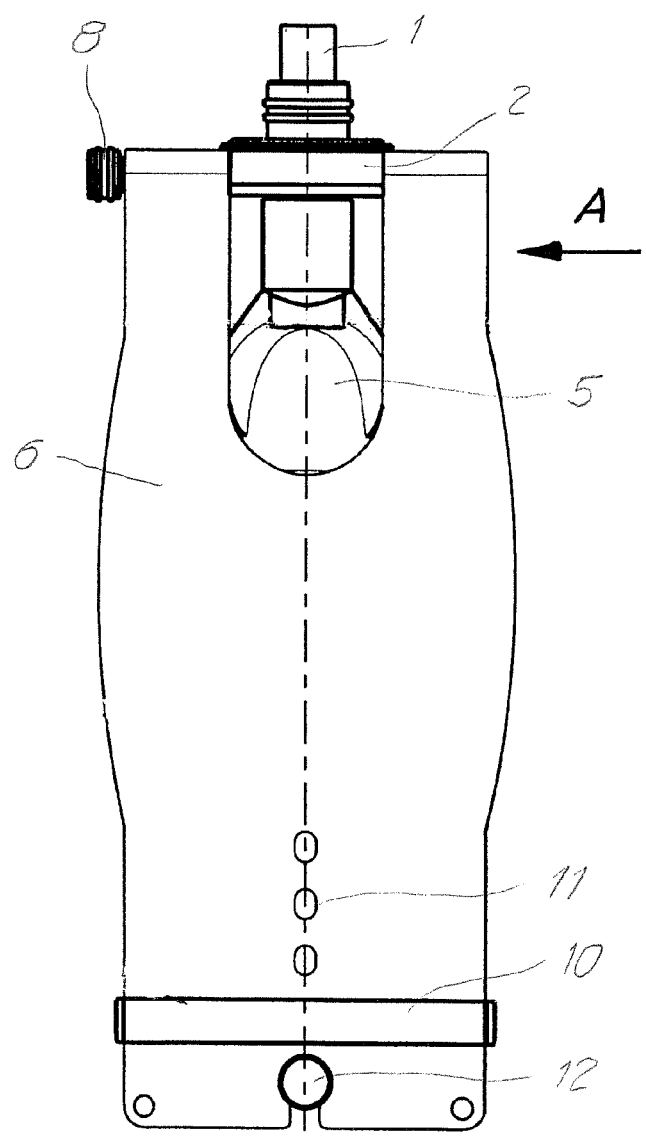
Fig. 2
Fig. 1

DEVICE FOR CHECKING ANESTHESIA AND VENTILATION UNITS

BACKGROUND

The invention relates to an apparatus for checking anaesthesia and ventilation devices, comprising a lung sac arranged between two lobes movable relative to one another, a lung inlet and adjustment means for adjusting the simulation parameters.

Such devices or apparatuses also referred to as "lung simulators" or as "test lung" are used for checking ventilation devices of all kinds and also anaesthesia devices for satisfactory operation before use on humans. The test lungs should if possible be capable of simulating different lung types. The properties of a lung are determined by the parameters resistance (respiratory tract resistance), compliance (hardness of the lungs) and leakage.

In the case of the test lungs used to date, a distinction should be made between two types differing substantially from one another:

Economical conventional test lungs are generally formed by a simple rubber sac (or balloon) which has exactly one resistance (respiratory tract resistance), one compliance (hardness of the lungs) and no leakage. Thus, checking of a ventilation device or anaesthesia device with such test lungs is possible only to an insufficient extent since it is not possible to simulate different lung types therewith. This frequently leads to alleged malfunctions of the device to be tested (e.g. so-called autotriggering), although the lung device to be tested is completely in order.

On the other hand, very complicated and expensive test lungs which operate, for example, by means of a bellows or a cylinder/piston system are disclosed, for example, in DE-A 2 403 616 or DE-A 3 427 182. In the case of such test lungs, the setting of the resistance (i.e. of the respiratory tract resistance) by means of various adapters and the setting of the compliance (i.e. hardness of the lungs) by means of springs or by means of a cylinder/piston system is achieved in fine gradation. Owing to the substantial mechanical design, such test lungs are very heavy, complicated to operate, expensive and generally operable only by means of external energy.

SUMMARY OF THE INVENTION

It is therefore the object of the invention to provide a simple test lung which can be economically produced and avoids said disadvantages.

According to the invention, this is achieved if at least one of the two lobes is in the form of an elastically deformable lobe. A compact design and a low weight of the lung simulator are achieved thereby and use without additional aids directly on the ventilation tube system is permitted.

In an expedient embodiment, both lobes are in the form of elastically deformable lobes. The lung sac is therefore arranged symmetrically between the two deformable lobes. This permits uniform expansion and contraction of the lung sac.

The lobes are advantageously firmly clamped at one end and elastically deformable. The lobes thus act in the manner of leaf springs. The spring properties can be influenced by the choice of the width and material thickness.

For handling the lung simulator, it is expedient if at least one of the lobes consists of plastic. Plastic lobes are chemically very resistant, kind to the body and durable.

In order that the spring properties of the lobes remain constant in the course of operation over the entire life, the lobe or lobes advantageously consists or consist of reinforced fibre composite. Depending on requirements, reinforcement may consist, for example, of glass fibres or polycarbonates.

In a further expedient embodiment, at least one of the lobes consists of spring steel. Spring steel permits a small wall thickness of the lobes and thus a very compact design.

For simple production and assembly of the lung simulator, it is advantageous if the two lobes are integrally connected to one another. The two lobes can preferably be connected to one another in a U-shape.

The springy length of the lobes is expediently adjustable by means of aids. This makes it possible firstly to change the spring temper of the lobes and secondly also the usable volume of the lung sac. The greater the springy length of the lobes, the softer are their spring properties. By shortening the springy length, the lobes become harder. This makes it possible to check different requirements using the same test lung.

The aids are advantageously in the form of slides connecting the free ends of the lobes to one another and displaceable and fixable in the longitudinal direction of the lobes. The slide can grip around the lobes from the outside or pass through them. The slide can be fixed, for example, by means of a clamping screw which can be loosened.

The slide is expediently lockable stepwise. This makes it possible to obtain unambiguously defined and repeatable test parameters. Moreover, this also prevents the parameters from becoming accidentally misadjusted in the course of the check.

The lung sac is advantageously flat and interchangeable. Owing to the flat design, the lung sac fits ideally in the space between the two lobes. The flat shape also permits a relatively large reservoir volume. Owing to the interchangeability of the lung sac, it is possible to check requirements with different lung volumes using the same test lung.

Expediently, the lung parameters "resistance" (respiratory tract resistance) and/or "compliance" (hardness of the lungs) and/or "leakage" (leakage losses) can be adjusted independently of one another in different steps. Owing to the very simple adjustability of the respiratory tract resistance, adjustable hardness of the lungs and adjustable leakage losses in different steps, virtually all lung types from babies to adults can be simulated without the use of additional adapters.

Continuous leakage simulation is advantageously provided. This makes it possible to check the function of patient flow triggering, which is very sensitive in practice, and respiration with leakage in a simple manner by changing the leakage simulation.

For monitoring the behaviour of the test lung, it is expedient if flow, pressure and/or volume measurements are integrated in the apparatus and the values can be displayed by means of a display unit on the test lung.

Further developments of the invention are given in the dependent patent claims.

DESCRIPTION OF FIGURES

The invention is explained in more detail below with reference to the drawings illustrated by way of example.

FIG. 1 shows a plan view of a test lung,

FIG. 2 shows a view of the test lung shown in FIG. 1, in the direction of the arrow A.

DETAILED DESCRIPTION OF THE INVENTION

Figure 3:
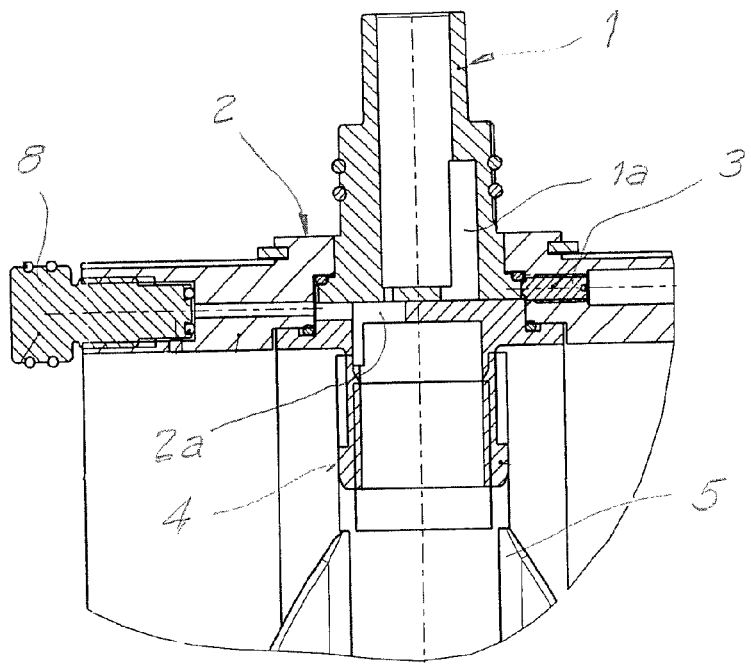
FIG. 3 shows a cross-section through the test lung shown in FIG. 2, along the line III-III.
Figure 4:
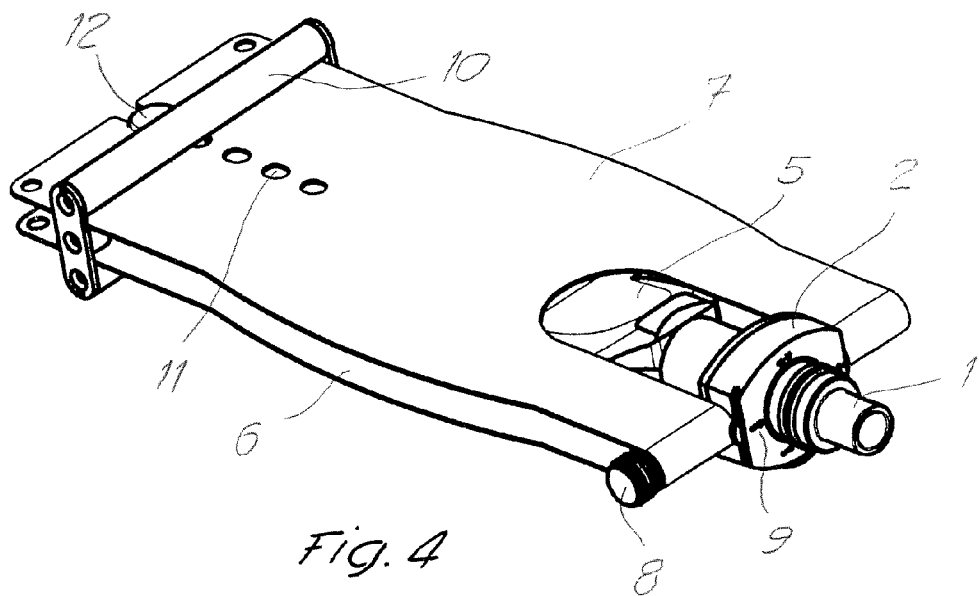
FIG. 4 shows a perspective view of the test lung shown in FIGS. 1 and 2.

The test lung shown in FIG. 1 to 4 comprises an inlet nozzle 1 which is connected to a housing 2 so as to be rotatable about its longitudinal axis. The inlet nozzle is provided with at least one channel 1a which can be brought into coincidence with passages 2a in the housing 2. The inlet nozzle 1 can be fixed in a desired rotational position by means of a lock 3—for example in the form of a ball catch or in the form of a clamping screw. This makes it possible to set a desired passage cross-section. On the opposite side of the inlet nozzle 1 is a connector 4. A balloon-like interchangeable lung sac 5 can be connected to the connector. The lung sac 5 is arranged between two elastically formed lobes 6, 7. The two lobes 6, 7 are preferably connected to one another in an integral and U-shaped manner around the housing 2. For inflating the lung sac 5, the lobes 6, 7 must be spread apart. Owing to their spring properties, the lobes 6, 7 offer a certain defined resistance to the spreading apart.

A control valve 8 is arranged on the side of the housing 2. The control valve 8 serves for setting a simulated leakage loss. In the position shown in FIG. 3, the control valve 8 is completely closed and the leakage loss is therefore zero. By unscrewing the control valve 8, the leakage loss can be continuously adjusted.

A scale 9 is mounted on the end face of the housing 2. With the aid of the scale 9, it is possible to determine the current rotational position of the inlet nozzle. On the basis of this scale, the simulation parameters can be changed stepwise or continuously. The set values are reproducible at any time.

The free ends of the lobes 6, 7 are connected to one another via an adjustable slide 10. By moving the slide 10, the spring properties of the lobes 6, 7 and hence the so-called compliance, i.e. the hardness of the test lung, can be adjusted. The slide 10 can be fixed stepwise by means of projections or cams engaging catch openings 11 in the lobes 6, 7. By shortening the free length of the lobes 6, 7, the spring stiffness thereof is increased. At the same time the usable volume of the lung sac is also reduced. In addition, a fixing screw 12 which serves for fixing that end of the lung sac 5 which is opposite the connector 4 to the lobes 6, 7 is arranged at the free end of the lobes 6, 7.

LIST OF REFERENCE NUMERALS

1 Inlet nozzle
  1a Channel
2 Housing
  2a Passage
3 Lock
4 Connector
5 Lung sac
6 Lobe
7 Lobe
8 Control valve
9 Scale
10 Slide
11 Catch opening
12 Fixing screw

The invention claimed is:

1. A lung simulator comprising:
    a first lobe panel, said first lobe panel being elastically deformable, said first lobe panel having a fixed first longitudinal end;
    a sac disposed under said first lobe panel;
    an inlet nozzle in fluid communication with said sac;
    said first lobe panel having a second longitudinal end opposite to said first longitudinal end;
    a second longitudinal end region of said first lobe panel proximate to said second longitudinal end;
    an adjustable slide externally disposed over said second longitudinal end region of said first lobe panel, said adjustable slide including a transverse member extending across the width of said lobe panel;
    a first group of catch openings located in said second longitudinal end region of said first lobe panel; and,
    at least one slide projection configured to engage said catch openings.

2. A lung simulator as claimed in claim 1, further comprising:
    a housing supporting said inlet nozzle; and,
    an adjustable control valve threaded into a bore in said housing, said adjustable control valve selectively controlling gas leakage from said inlet nozzle.

3. A lung simulator as claimed in claim 1, further comprising:
    a housing configured to rotatably support said inlet nozzle;
    a lock configured to fix said inlet nozzle at one of plural selectable rotational locations relative to said housing; and,
    a variable inlet passage for nozzle flow, said variable inlet passage having flow cross-sectional area determined by a selected rotational location of said inlet nozzle relative to said housing.

4. The lung simulator as claimed in claim 1, wherein:
    said first lobe panel is made of plastic.

5. The lung simulator as claimed in claim 4, wherein:
    said first lobe panel includes reinforced fiber composite.

6. The lung simulator as claimed in claim 1, wherein:
    said first lobe panel is made of spring steel.

7. A lung simulator as claimed in claim 1, further comprising:
    a second lobe panel, said second lobe panel having a respective fixed first longitudinal end, said second lobe panel having a respective second longitudinal end opposite to said first longitudinal end of said second panel.

8. The lung simulator as claimed in claim 7, wherein:
    said respective first longitudinal end of said first lobe panel is integrally connected to said second lobe panel's respective first longitudinal end.

9. A lung simulator as claimed in claim 7, further comprising:
    said adjustable slide includes a second transverse member extending across the width of said second lobe panel.

10. A lung simulator as claimed in claim 7, further comprising:
    said second lobe panel having a respective second longitudinal end region proximate to its respective second longitudinal end;
    a second group of catch openings located in said respective second longitudinal end region of said second lobe panel.

11. A lung simulator comprising:
    a first lobe panel, said first lobe panel being elastically deformable, said first lobe panel having a fixed first longitudinal end;
    a sac disposed under said first lobe panel;
    an inlet nozzle connected to said sac;
    said first lobe panel having a second longitudinal end opposite to said first longitudinal end;
    a second longitudinal end region of said first lobe panel proximate to said second longitudinal end;
    an adjustable slide externally disposed at said second longitudinal end region of said first lobe panel;
    a first group of catch openings located in said second longitudinal end region of said first lobe panel;

at least one slide projection configured to engage said catch openings;
a housing configured to rotatably support said inlet nozzle;
a lock configured to fix said inlet nozzle at one of plural selectable rotational locations relative to said housing;
a variable inlet passage for nozzle flow, said variable inlet passage having flow cross-sectional area determined by a selected rotational location of said inlet nozzle relative to said housing; and,
an adjustable control valve threaded into a bore in said housing, said adjustable control valve selectively controlling gas leakage from said inlet nozzle.

12. A lung simulator as claimed in claim 11, further comprising:
a second lobe panel, said second lobe panel having a respective fixed first longitudinal end, said second lobe panel having a respective second longitudinal end opposite to said first longitudinal end of said second panel.

13. The lung simulator as claimed in claim 12, wherein:
said respective first longitudinal end of said first lobe panel is integrally connected to said second lobe panel's respective first longitudinal end.

14. A lung simulator as claimed in claim 12, further comprising:
said adjustable slide is externally disposed over said second longitudinal end region of said first lobe panel, said adjustable slide including a first transverse member extending across the width of said first lobe panel.

15. A lung simulator as claimed in claim 14, further comprising:
said adjustable slide includes a second transverse member extending across the width of said second lobe panel.

16. A lung simulator as claimed in claim 12, further comprising:
said second lobe panel having a respective second longitudinal end region proximate to its respective second longitudinal end;
a second group of catch openings located in said respective second longitudinal end region of said second lobe panel.

17. A lung simulator as claimed in claim 12, further comprising:
a fixing screw connecting the respective second longitudinal ends of said first and second lobes.

18. A lung simulator as claimed in claim 11, further comprising:
a rotary hand knob configured for manual rotation of said adjustable control valve.

19. A lung simulator as claimed in claim 11, further comprising:
a scale configured to indicate the rotational position of said inlet nozzle, said scale mounted on an end face of said housing.

20. A lung simulator comprising:
a first lobe panel, said first lobe panel being elastically deformable, said first lobe panel having a fixed first longitudinal end;
said first lobe panel having a second longitudinal end opposite to said first longitudinal end;
a second longitudinal end region of said first lobe panel proximate to said second longitudinal end;
a second lobe panel, said second lobe panel having a respective fixed first longitudinal end, said second lobe panel having a respective second longitudinal end opposite to said first longitudinal end of said second lobe panel, said second lobe panel having a respective second longitudinal end region proximate to its respective second longitudinal end;
said respective first longitudinal end of said first lobe panel is integrally connected to said second lobe panel's respective first longitudinal end;
an adjustable slide clamp externally disposed over said second longitudinal end region of said lobe panels, said adjustable slide clamp including a first transverse member extending across the width of said first lobe panel, said adjustable slide clamp including a second transverse member extending across the width of said second lobe panel;
catch openings located in said respective second longitudinal end regions of said lobe panels;
slide clamp projections configured to engage said catch openings;
a sac disposed between said first and second lobe panels;
an inlet nozzle in fluid communication with said sac;
a housing configured to rotatably support said inlet nozzle;
a lock configured to fix said inlet nozzle at one of plural selectable rotational locations relative to said housing;
a variable inlet passage for nozzle flow, said variable inlet passage having flow cross-sectional area determined by a selected rotational location of said inlet nozzle relative to said housing;
a scale configured to indicate the rotational position of said inlet nozzle, said scale mounted on an end face of said housing; and,
an adjustable control valve threaded into a bore in said housing, said adjustable control valve selectively controlling gas leakage from said inlet nozzle.

* * * * *